US007130791B2

(12) United States Patent
Ko

(10) Patent No.: US 7,130,791 B2
(45) Date of Patent: Oct. 31, 2006

(54) COMPUTER SYSTEM AND OSD DISPLAYING METHOD FOR THE SAME

(75) Inventor: Kyung-Pill Ko, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 902 days.

(21) Appl. No.: 09/898,089

(22) Filed: Jul. 5, 2001

(65) Prior Publication Data

US 2002/0122069 A1 Sep. 5, 2002

(30) Foreign Application Priority Data

Feb. 20, 2001 (KR) ................................. 2001-8455

(51) Int. Cl.
*G06F 17/28* (2006.01)
(52) U.S. Cl. .............................. 704/3; 725/47; 715/740; 715/857
(58) Field of Classification Search ................ 704/3; 725/47; 715/740, 857
See application file for complete search history.

(56) References Cited

U.S. PATENT DOCUMENTS

| 5,384,576 | A | * | 1/1995 | Tashiro et al. ................ 345/3.1 |
| 5,570,134 | A | * | 10/1996 | Hong ........................... 348/467 |
| 5,986,638 | A | * | 11/1999 | Cheng .......................... 715/857 |
| 6,008,836 | A | * | 12/1999 | Bruck et al. .................. 725/131 |
| 6,469,713 | B1 | * | 10/2002 | Hetherington et al. ....... 715/740 |
| 2002/0083453 | A1 | * | 6/2002 | Menez ........................ 725/47 |

FOREIGN PATENT DOCUMENTS

| JP | 08-160930 | 6/1996 |
| JP | 08-195914 | 7/1996 |
| JP | 11-331723 | 11/1999 |
| KR | 019477/1997 | 4/1997 |
| KR | 019478/1997 | 4/1997 |
| KR | 039426/1998 | 8/1998 |
| KR | 000412/1999 | 1/1999 |
| KR | 057589/1999 | 7/1999 |

\* cited by examiner

*Primary Examiner*—Richemond Dorvil
*Assistant Examiner*—Qi Han
(74) *Attorney, Agent, or Firm*—Robert E. Bushnell, Esq.

(57) ABSTRACT

Disclosed is a computer system including a computer body operated according to a predetermined operating system, and a display device having a display section for receiving a video signal from the computer body to display images on the screen thereof in response to the received video signal. The computer body includes a language information-providing section adapted to provide the display device with information about the kind of language used in the operating system. The display device includes an OSD generating section adapted to generate an OSD for setting a display environment of the display device, a memory adapted to store a plurality of languages that can be used in the OSD therein and to store the language information received from the computer body, and an OSD control section adapted to control the OSD generating section to display the OSD on the display section by means of the same language as that used in the operating system in accordance with language information.

14 Claims, 5 Drawing Sheets

FIG. 4A
```
MENU
1. POSITION
2. SIZE
3. LANGUAGE SELECT
4. TURN OFF TIME
```
FIG. 4B
FIG. 4C
Auto Language Select
Korean 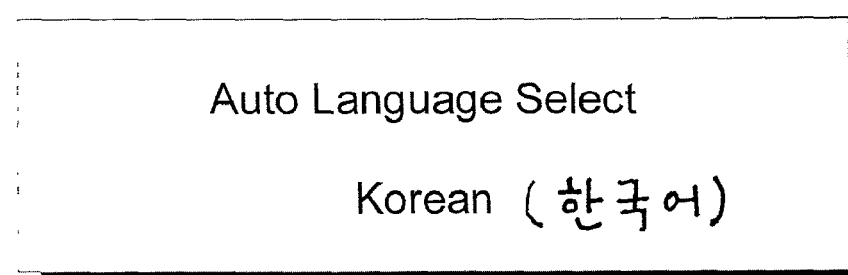
FIG. 4D
Auto Language Select
English

COMPUTER SYSTEM AND OSD DISPLAYING METHOD FOR THE SAME

CLAIM OF PRIORITY

This application makes reference to, incorporates the same herein, and claims all benefits accruing under 35 U.S.C. §119 from an application entitled COMPUTER SYSTEM AND OSD CONTROLLING METHOD THEREOF filed with the Korean Industrial Property Office on Feb. 20, 2001 and there duly assigned Ser. No. 8455/2001.

BACKGROUND OF THE INVENTION

1. Field of the Invention

The present invention relates to a computer system and OSD displaying method for the computer system, and more particularly, a computer system and OSD displaying method for the computer system in which an OSD is automatically set to be displayed by means of the same language as that used in an operating system.

2. Description of the Related Art

An on screen display (OSD) menu is displayed on a display device, such as a monitor, by means of a specific language set by a user regardless of the language used in an operating system, such as an English window or a Korean window, of a computer system.

In general, the computer system includes a computer body operated according to the predetermined operating system, and a display device having a display section for receiving a video signal from the computer body to display images in response to the received video signal on the screen thereof.

Such a display device includes an OSD menu for setting a display environment of the display section. The OSD menu is activated and displayed on the display section by the selection of a menu key of a key inputting section formed at one front edge side the display device. The OSD menu displayed on the display section includes a plurality of menu icons for adjusting display environment-setting parameters, such as a shape, a color, a display language, etc., of the display section. Also, the display section includes a menu display section for displaying detailed information associated with a function description of a selected one of the menu icons or sub-menus of the selected menu icon, etc. Accordingly, a user changes or adjusts a desired display environment-setting parameter of the display device through the detailed information displayed on the menu display section.

However, the conventional display device displays the OSD menu and the detailed information in English or a specific language set by the user in the display device while the computer system is operated by an operating system such as Windows and the like supported in a language different from the language of the display device. Therefore, the display device is operated irrespective of the operating system. Accordingly, the display device needs to store a plurality of languages being used in the OSD menu including the detailed information. In order to modify a language parameter among the display environment-setting parameters, it is very inconvenient for the user to select one of the menu icons of the OSD menu and to change one language to the other language with the detailed information of the selected menu regardless of the language used in the operating system of the computer system.

SUMMARY OF THE INVENTION

It is an object of the present invention to provide an improved system able to automatically set a language used in an OSD menu to the language used in an operating system of a computer system.

It is another object of the present invention to provide an improved computer system and OSD displaying method for the computer system able to automatically display an OSD menu by means of the same language as that of an operating system (OS) used in the computer system.

According to an aspect of the present invention, there is provided a computer system including a computer body operated according to a predetermined operating system and generating language information used in the operating system. The computer system includes a display device having a display section for receiving a video signal from the computer body to display images on a screen thereof in response to the received video signal, and for receiving the language information to display on the screen a display menu by means of a language in accordance with the language information.

The computer system includes a language information-providing section adapted to provide the display device with information about the kind of language used in the operating system, the language information-providing section being included in the computer body. The display device includes an OSD generating section adapted to generate an OSD for setting a display environment of the display device, a memory adapted to store a plurality of languages that can be used in the OSD therein, and to store the language information generated from the language information providing section of the computer system, and an OSD control section adapted to control the OSD generating section such that the OSD is displayed on the display section by means of the same language as that used in the operating system based on the language information applied thereto from the language information-providing section upon the initial activation of the OSD, the same language being one of the plurality of languages stored in the memory.

The OSD control section may control the OSD generating section to display the OSD by means of a predetermined specific language, such as an English language, set by a user if a language coincident with the language-kind-information applied to the OSD control section from the language information-providing section does not exist in the memory.

According to another aspect of the present invention, there is also provided an OSD displaying method of storing a plurality of languages that can be used in an OSD in a memory of the display device, identifying the kind of language used in an operating system of the computer body, and displaying the OSD by means of the same language as that used in the operating system if a language coincident with that used in the operating system exists in the memory based on information about the identified language.

BRIEF DESCRIPTION OF THE DRAWINGS

A more complete application of this invention, and many of the attendant advantage thereof, will be readily apparent as the same becomes better understood by reference to the following detailed description when considered in conjunction with the accompanying drawing in which like reference symbols indicate the same or similar component, wherein:

FIGS. 4A–4D are OSD menu screens showing the process of selecting a language in the display device.

DETAILED DESCRIPTION OF THE PREFERRED EMBODIMENT

Figure 1:
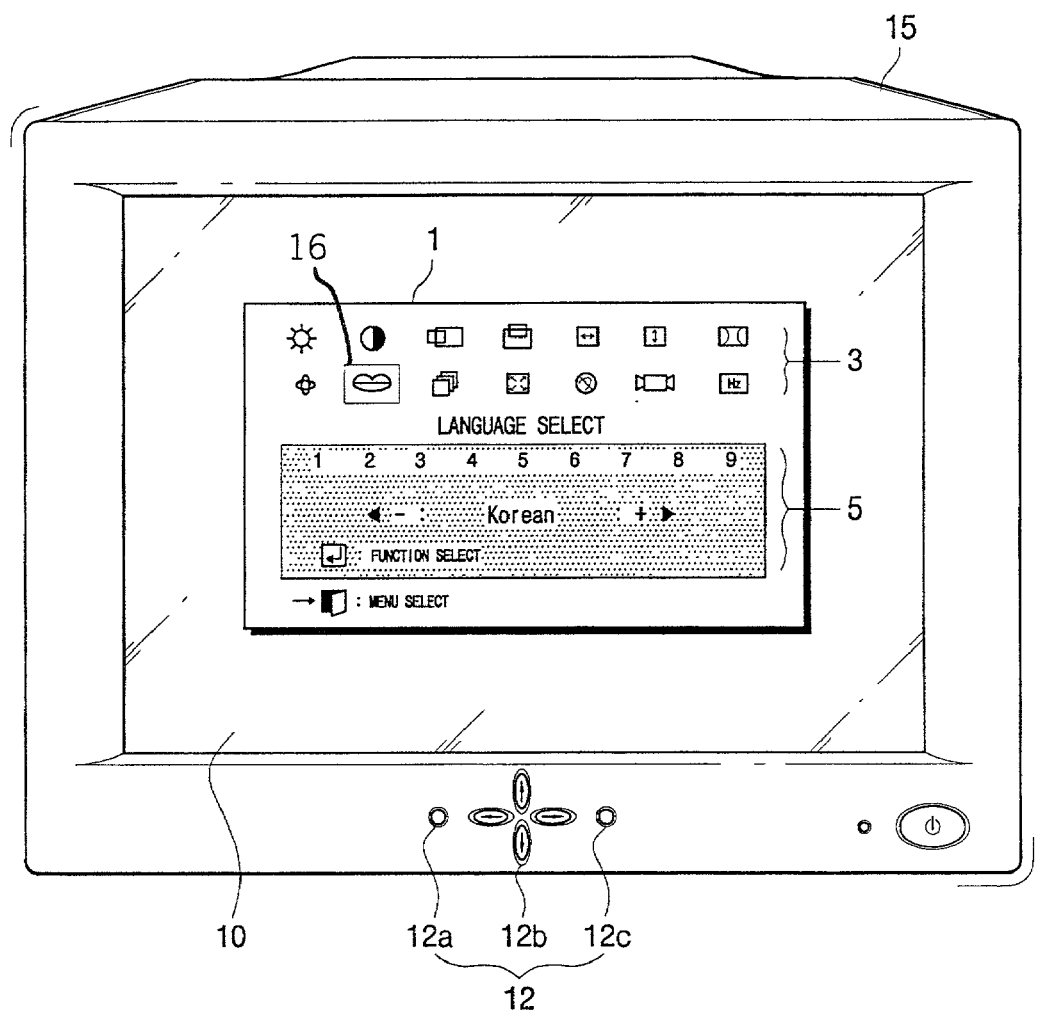
FIG. 1 is a front view illustrating a display device having an OSD menu activated thereon constructed according to the present invention.

Referring to FIG. 1, a display device 15 includes a display section 10 for displaying an On Screen Display (OSD) menu 1 or images on a screen thereof in response to a video signal applied thereto from an external computer body, and a key inputting section 12 formed at one front edge side of display device 15 and disposed to be close to a lower end part of display section 10 for generating a control signal to control an OSD menu 1 of display section 10, such as color, size, language, etc.

Key inputting section 12 includes a menu key 12a for activating an OSD menu 1 on display section 10, four directional keys 12b, i.e., UP/DOWN/LEFT/RIGHT keys for moving a pointer indicated on OSD menu 1 to select a desired menu and/or adjusting the selected menu, and an exit or proceed key 12c for closing OSD menu 1 or replacing a present menu with a previous upper menu or a next menu.

When menu key 12a of key inputting section 12 is selected to activate OSD menu 1, a plurality of menu icons 3 for adjusting environmental parameters, such as color, size, position, language, etc., of display device 15 are displayed on display section 10. Simultaneously displayed below menu icons 3 is a menu display section 5 for displaying a description relative to each of menu icons 3 or sub-menus with respect to each menu. Since a menu icon 16 for selecting a language displayed on OSD menu 1 is also included in menu icons 3, a user can change a language-setting parameter of OSD menu 1 by clicking language menu icon 16.

Figure 2:
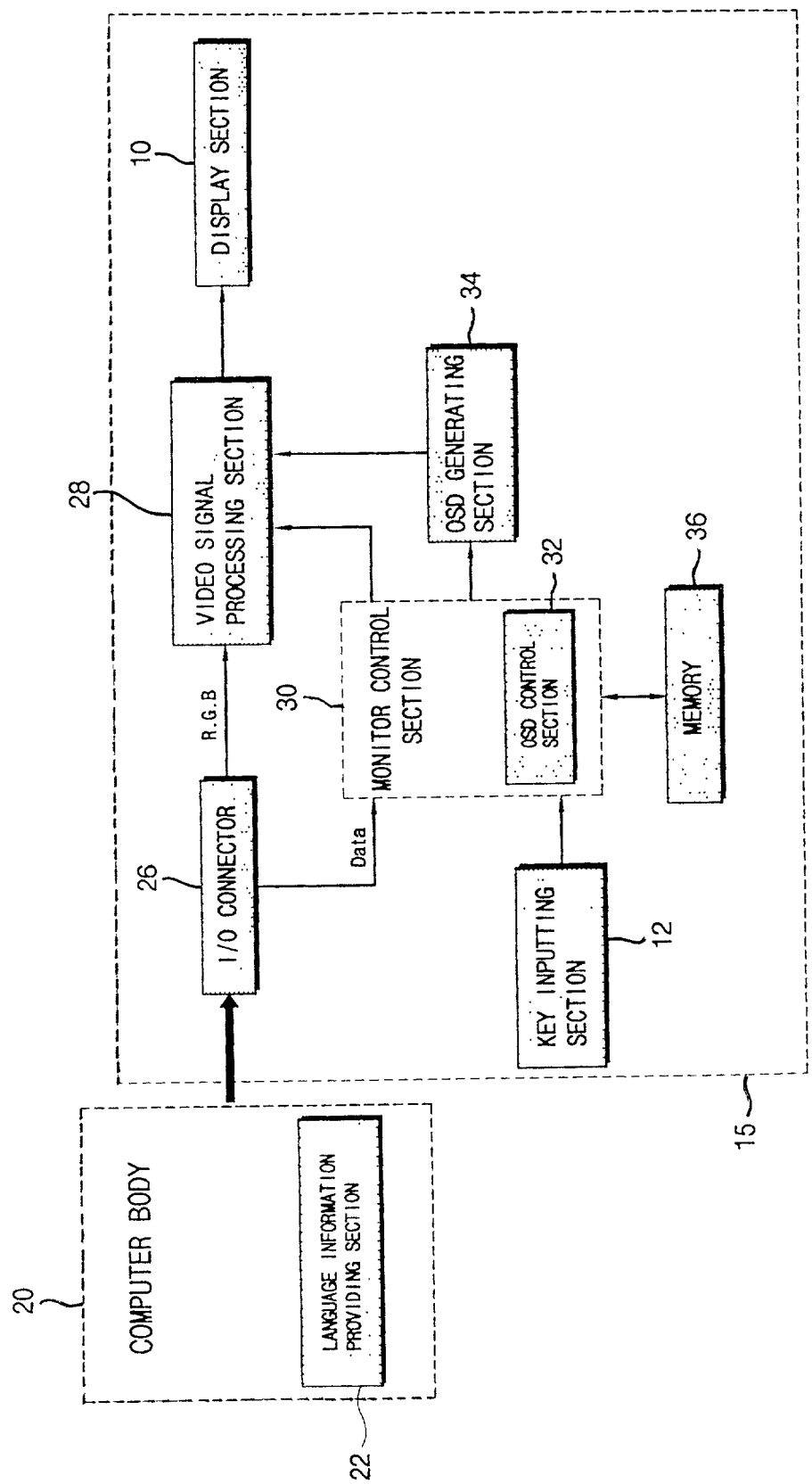
FIG. 2 is a block diagram illustrating the construction of a computer system and a display device constructed according to the present invention.

As shown in FIG. 2, a computer system according to the present invention includes a computer body 20 operated according to a predetermined operating system and adapted to provide display device 15 with Red, Green, and Blue (RGB) video signals and a data signal associated with language information relating to the language used in the operating system, and display device 15 having display section 10 for displaying images on the screen thereof in response to the video signals applied thereto from computer body 20 through a cable connector 50. Computer body 20 includes a language information-providing section 22 for providing display device 15 with language information data about the language used in the operating system. Computer body 20 is controlled under the operating system, such as Windows and the like, and has language information used in the operating system stored therein.

Display device 15 includes an I/O connector 26 coupled to computer body 20 through a cable connector 50, a video signal processing section 28, a display section 10, a monitor control section 30, an OSD generating section 34, and a memory 36 storing control data and language information data. The I/O connector 26 is connected to the computer body 20 for receiving the RGB video signals and the data signal associated with the language information and the control signal from computer body 20. Video signal processing section 28 converts the RGB video signals, applied thereto from computer body 20 through I/O connector 26, into an image signal. Display section 10 displays the image thereon in response to the image signal. The monitor control section 30 receives the data signal from computer body 20 through I/O connector 26 and controls a function of display device 15. OSD generating section 34 processes OSD data applied thereto from monitor control section 30 to display OSD menu 1 on display section 10 through video signal processing section 28. Memory 36 stores a plurality of languages that can be used in the OSD menu display therein. Monitor control section 30 includes an OSD control section 32 for controlling OSD generating section 34 such that OSD menu 1 is displayed on display section 10 by means of the same language that is used in the operating system based on the language information data which is applied thereto from language information-providing section 22 upon the initial activation of the OSD menu display function. OSD control section 32 generates an OSD control signal to control OSD generating section 34 according to the user's key input through key inputting section 12. OSD generating section 34 processes the OSD data from OSD menu 1 according to the OSD control signal outputted from OSD control section 32, and applies a signal to video signal processing section 28 to display OSD menu 1 on display section 10.

Memory 36 connected to monitor control section 30 has descriptions relative to menu icons 3, or sub-menus with respect to each menu, etc., stored therein by means of a plurality of different language characters, such as Korean language characters, English language characters, etc.

Therefore, when the computer system is booted to execute a specific operating system, drivers of peripheral equipment connected to computer body 20, such as a printer, a display device, etc., are installed in computer body 20. After the drivers are installed, computer body 20 provides display device 15 with the language information used in the specific operating system and stored in language information-providing section 22 of computer body 20.

The language information provided to display device 15 from computer body 20 is applied to OSD control section 32 of monitor control section 30 through I/O connector 26. OSD control section 32 reads out the language information data representing a specific language character to be used in OSD menu 1 coincident with the received language information of the specific operation system stored in memory 36 to modify a language-setting parameter of OSD menu 1.

Accordingly, when a user selects menu key 12a (FIG. 1) of key inputting section 12 to activate OSD menu 1, OSD control section 32 (FIG. 2) generates an OSD control signal to control OSD generating section 34. At this time, OSD generating section 34 processes the OSD menu data according to the OSD control signal outputted from OSD control section 32 so as to apply the processed signal to video signal processing section 28 to display OSD menu 1 on display section 10. At this point, terms and menus displayed on OSD menu 1 are displayed by means of the same language characters as that of the language information provided from language information-providing section 22 and used in the specific operation system.

Figure 3:
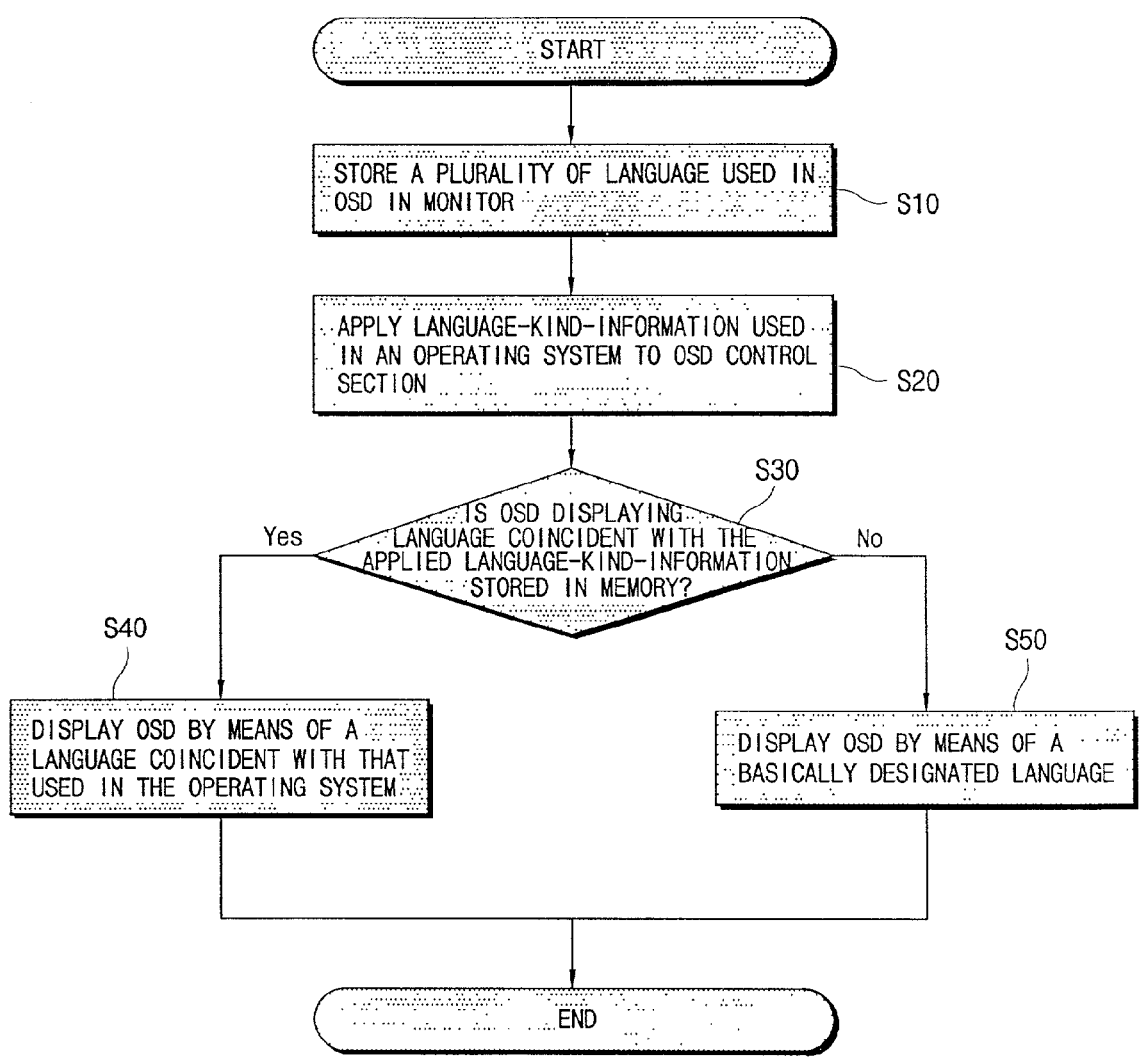
FIG. 3 is a flowchart illustrating the process of controlling a display of the OSD on the display device in a computer system.

FIG. 3 is a flowchart illustrating the process of controlling a display of the OSD menu 1 on display device 15 in a computer system constructed according to the present invention.

A plurality of languages that can be used in an OSD menu 1 are stored in memory 36 of display device 15 in step S10.

When a power supply is applied to the computer system, computer body 20 installs system devices and drivers of the peripheral equipment in order. When display device 15 is installed, computer body 20 provides display device 15 with the language information used in an operating system currently used in computer body 20. At this point, the language information provided to display device 15 is applied to OSD control section 32 of monitor control section 30 through I/O connector 26 in step S20. Then, OSD control section 32 determines whether or not an OSD menu displaying language which is coincident with the language used in the operating system is stored in the memory 36 in step S30. If it is determined at step S30 that the OSD menu displaying language coincident with language information representing the language used in the operating system is stored in memory 36, the program proceeds to step S40 where OSD control section 32 sets OSD menu displaying language as a language coincident with the language used in the operating system. On the other hand, if it is determined at step S30 that the OSD menu displaying language coincident with the language used in the operating system is not stored in memory 36, the program proceeds to step S50 in which OSD control section 32 sets the OSD menu displaying language such that the OSD menu 1 is displayed by means of a basically designated language. Typically, the basically designated language is English.

FIG. 4A shows an OSD menu 1 displayed in English language characters on display device 15. FIG. 4B shows a sub-menu for selecting a language for the OSD menu 1. FIGS. 4C and 4D show Korean and English selected by the user, respectively.

Figure 5A:
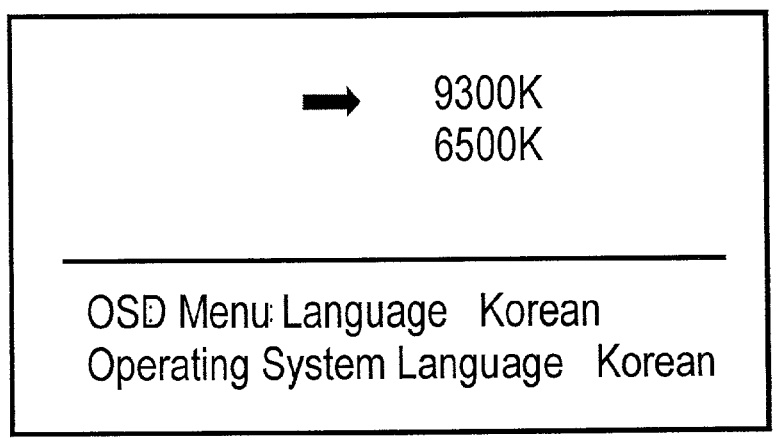
FIGS. 5A–5C show a display selection of the display device displaying the OSD menu in the language in accordance with the language information of the operating system of the computer system.
Figure 5B:
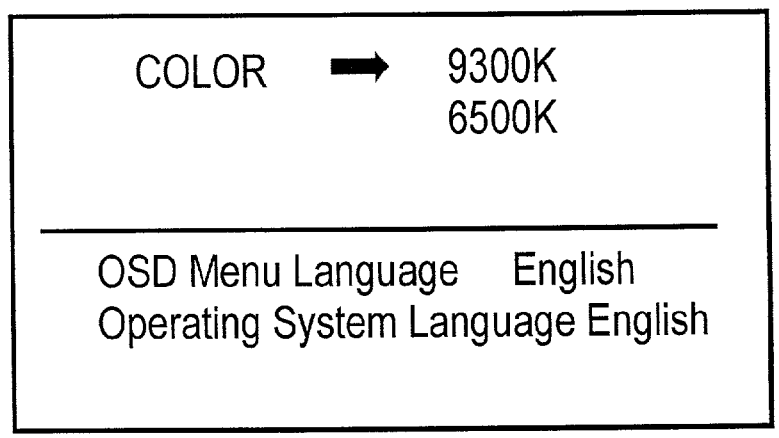
Figure 5C:
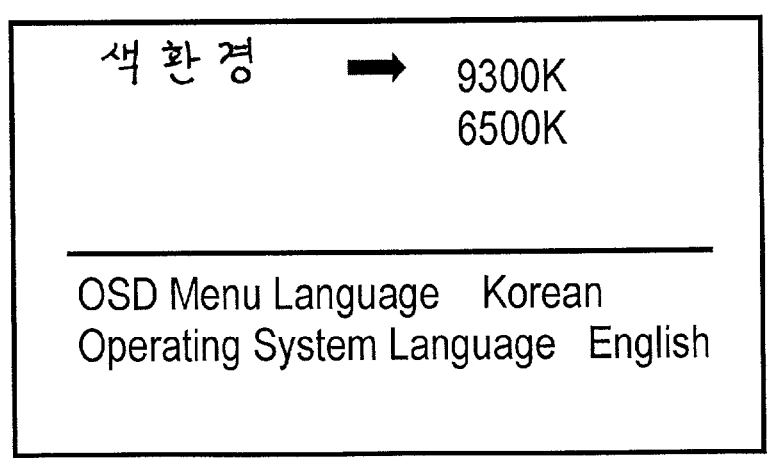

FIGS. 5A thru 5C show a sub-menu displayed in Korean language and English language, respectively, on display device 15 in accordance with the selection of the user. FIGS. 5A and 5B show that the language used in the OSD menu 1 is the same as the language used in the operating system, such as English language window system or Korean language window system. FIG. 5C shows that the language used in the OSD menu 1 is different from the language used in the operating system.

As described above, the present invention provides the language information used in an operating system of the computer system to display device 15, so that OSD control section 32 of display device 15 sets the language to be displayed on OSD menu 1 so as to be coincident with the language used in the operating system. As a result, the user does not have to modify a language-setting parameter of OSD menu 1 in order to set the language for OSD menu 1 to the language used in the operating system. This is very convenient for the user who does not use English language as a language for the OSD menu 1.

In the meantime, although there has been described above only the case where computer body 20 is separated from the display device 15, it will be understood that the application of an automatic language establishment for the OSD menu 1 is possible in the case of employing an operating system supported by different languages of each nation in a monitor having an OSD displaying function, such as a web monitor, a PC-integrated monitor, etc.

As can be seen from the foregoing, the present invention provides a computer system in which an OSD is set automatically to be displayed by means of the same language as that used in an operating system upon the initial activation of the OSD menu 1.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A computer system including a predetermined operating system, comprising:
   a language information-providing section for storing and generating language information about a first language used in said operating system;
   an on screen display (OSD) generating section for generating an OSD for setting a display environment of a display device;
   a memory for storing a plurality of second languages used in said OSD; and
   an OSD control section for determining whether said first language is included in said plurality of second languages, and for automatically controlling said OSD generating section to display said OSD on a display section of said display device in said first language when said first language is included in said plurality of second languages as determined by said OSD control section;
   wherein said language used in said OSD is automatically made to coincide with said first language used in said operating system when said first language is included in said plurality of second languages.

2. The computer system of claim 1, wherein said OSD control section controls said OSD generating section to display said OSD by means of one of said second languages when said first language is not included in said plurality of second languages as determined by said OSD control section.

3. The computer system of claim 2, wherein said one of said second languages is English.

4. An on-screen display (OSD) displaying method, comprising the steps of:
   storing a first language used in an operating system of a computer in a memory;
   storing a plurality of second languages used in an OSD in said memory;
   making a determination as to whether said first language used in said operating system is one of said second languages stored in said memory; and
   automatically displaying said OSD in said first language when said first language is one of said second languages stored in said memory so as to automatically make said language used in said OSD coincide with said first language.

5. The OSD displaying method of claim 4, further comprising the step of displaying the OSD by means of one of said second languages when said first language is not one of said second languages stored in said memory.

6. The OSD displaying method of claim 5, wherein said one of said second languages is English.

7. A computer system operated by an operating system with a first language, comprising:
   a computer body generating video signal data in response to operation of said operating system, said computer body storing first language information data about said first language and generating said first language information data; and
   a display device coupled to said computer body for receiving said video signal data and said first language information data, said display device displaying an on-screen display (OSD) in accordance with said first language information data;

said display device comprising a memory for storing said first language information data and a plurality of second language information data; and said display device further comprising a first key for activating said OSD and a second key for automatically setting said display device to display said OSD in said first language when said first language information data is included in said plurality of second language information data;

wherein said language used in said OSD is automatically made to coincide with said first language used in said operating system.

8. The computer system of claim 7, wherein said display device displays a visual image in accordance with said video signal data.

9. The computer system of claim 7, said display device comprising:

an OSD generator for generating said OSD; and an OSD controller coupled between said computer body and said OSD generator for controlling said OSD generator to display said OSD in said first language when said first language information data is included in said plurality of second language information data.

10. The computer system of claim 7, said display device displaying said OSD in accordance with one of said plurality of second language information data when said plurality of second language information data does not include said first language information data.

11. A computer system, comprising:

a display device having an input section coupled to a computer body which is operated by an operating system; and a memory coupled to said input section for receiving first language information data representing a first language used in said operating system through said input section, and for storing said first language information data, said memory storing second language information data representing at least one second language used in said OSD;

said display device automatically displaying an OSD in one of said at least one second language when said first language information data is not included in said second language information data so as to automatically make said language used in said OSD coincide with said first language used in said operating system.

12. The computer system of claim 11, said display device displaying said OSD in said first language in response to said first language information data when said first language information data is included in said second language information data.

13. A method in a computer system which includes a memory, said method comprising the steps of:

storing in the memory first language information data representing a first language used in an operating system operating said computer system;

storing in the memory a plurality of second language information data representing second languages used for an on-screen display (OSD); and automatically displaying the OSD in said first language in accordance with said first language information data stored in said memory when said first language information data is included in said second language information data;

wherein said language used in said OSD is automatically made to coincide with said first language used in said operating system.

14. The method of claim 13, further comprising the step of displaying the OSD by means of one of said second languages when said first language is not included in said second languages.

* * * * *